United States Patent [19]

Herman et al.

[11] Patent Number: 4,602,364
[45] Date of Patent: Jul. 22, 1986

[54] LOCAL AREA DATA COMMUNICATION NETWORK

[75] Inventors: Alexander Herman, Sharon; Murray H. Bolt, Westwood; Daniel C. Scavezze, Walpole, all of Mass.

[73] Assignee: Codex Corporation, Mansfield, Mass.

[21] Appl. No.: 603,174

[22] Filed: Apr. 23, 1984

[51] Int. Cl.$^4$ .......................... H04J 3/02; H04Q 11/04
[52] U.S. Cl. ........................................... 370/85; 370/60
[58] Field of Search ............................ 370/85, 60, 94; 340/825.5, 825.52

[56] References Cited

U.S. PATENT DOCUMENTS

| | | | |
|---|---|---|---|
| 4,063,220 | 12/1977 | Metcalf et al. | 340/147 |
| 4,099,024 | 7/1978 | Boggs et al. | 370/85 |
| 4,210,780 | 7/1980 | Hopkins et al. | 370/85 |
| 4,234,952 | 11/1980 | Gable et al. | 370/94 |
| 4,281,380 | 7/1981 | DeMesa, III et al. | 364/200 |
| 4,292,623 | 9/1981 | Esuaran et al. | 370/85 |
| 4,332,022 | 5/1982 | Malcolm et al. | 370/85 |
| 4,347,498 | 9/1982 | Lee et al. | 340/825.02 |
| 4,412,326 | 10/1983 | Limb | 370/85 |
| 4,413,258 | 11/1983 | Quick, Jr. et al. | 340/825.5 |
| 4,432,088 | 2/1984 | Frankel | 370/85 |

FOREIGN PATENT DOCUMENTS 0093623  5/1983  European Pat. Off. .
83/03178  2/1983  PCT Int'l Appl. .

OTHER PUBLICATIONS

Wood, "Systems View of Token-Ring Local Area Networks, TI-MIX Symposium: Communicating and Networking," Apr. 5-8, 1983.

*Primary Examiner*—Douglas W. Olms
*Assistant Examiner*—Frank M. Scutch, III

[57] ABSTRACT

A data communication network over which data handling devices can transmit and receive packets among themselves having a bus, a number of subnetworks (each having interfaces for connecting a number of devices to each subnetwork), a concentrator for connecting each interface to the bus, each concentrator having a transceiver for transmitting, to the bus and to devices connected to each subnetwork, packets originating from devices within a subnetwork (transmitted packets), and for receiving from the bus packets originating from other subnetworks (received packets), collision avoidance circuitry for monitoring transmission attempts by devices connected to the subnetwork, for detecting competing transmission attempts that would create a collision on the subnetwork, and, upon such detection, permitting a selected attempt to enter the subnetwork, while preventing other attempts from entering it, collision detection circuitry for monitoring the bus and preventing all attempted transmissions from entering the bus whenever a packet from another subnetwork is present on the bus. In another aspect the interface means and the concentrator means include a network interface unit and a further interface unit.

13 Claims, 3 Drawing Figures

LOCAL AREA DATA COMMUNICATION NETWORK

BACKGROUND OF THE INVENTION

This invention relates to data communication networks, e.g., so-called local area networks ("LAN"s).

Such networks have come into widespread use to allow computers, peripheral user devices and stations, and other data processing and communication devices to communicate among themselves.

One type of network connects each device to central switching circuitry that functions as a switchboard, connecting each transmitting device with its intended receiving device as free lines become available.

Another type of network uses the so-called packet switching technique, as described, e.g., in Metcalfe et al. U.S. Pat. No. 4,063,220. Each device is connected to a common network (e.g., a coaxial cable bus) through a network interface unit that controls the access of its associated device to the network; if the interface unit senses that the network is free of carrier energy it allows its associated device to transmit a packet of bits consisting of a preamble, address information, and message data. Due to propagation delays on the line, two or more such interface units may permit their associated devices to initiate transmissions that will overlap in time, and create a "collision" on the network. A transceiver has "collision detection" circuitry for detecting collisions and for sending a collision signal to all interface units, which abort any transmissions they might have begun upon receipt of such signals. A network design incorporating such a collision detection system is called a carrier sense multiple access with collision detection (CSMA/CD) system.

A commercial embodiment of such a CSMA/CD system has been marketed by Xerox under the trademark, Ethernet. This embodiment uses network interface units (NIU's) that conform to the IEEE 802.3 standard and that have four input/output lines (each typically a twisted pair of wires) that, respectively, allow the interface unit to transmit packets, receive packets, receive collision signals, and supply power. The physical connection of these lines to the coaxial bus is made by a "vampire connector", a mechanical device that makes contact with the coaxial sheathing and also pierces the sheathing to make contact with the central conductor.

Another type of network design, called carrier sense multiple access with collision avoidance (CSMA/CA), prioritizes attempted transmissions and allows only the then highest priority transmission to be transmitted, thereby avoiding any actual collisions within the network.

In one embodiment of such a CSMA/CA, as described in, e.g., "Systems View of Token-Ring Local Area Networks," paper by Gary L. Wood given at TI-MIX *Symposium: Communicating and Networking*, Apr. 5–8, 1983, a number of devices with interface units are wired to a central unit in a logical loop. A "token" signal moves continually through this loop and determines what unit may transmit at any time, thus avoiding collisions in the system. Loops may be connected to form larger loops operating on the same principle.

SUMMARY OF THE INVENTION

In general, the invention features in one aspect a bus, a number of subnetworks (each having interfaces for connecting a number of devices to each subnetwork), a concentrator for connecting each interface to the bus, each concentrator having a transceiver for transmitting, to the bus and to devices connected to each subnetwork, packets originating from devices within a subnetwork (transmitted packets), and for receiving from the bus packets originating from other subnetworks (received packets), collision avoidance circuitry for monitoring transmission attempts by devices connected to the subnetwork, for detecting competing transmission attempts that would create a collision on the subnetwork, and, upon such detection, permitting a selected attempt to enter the subnetwork, while preventing other attempts from entering it, and collision detection circuitry for monitoring the bus and preventing all attempted transmissions from entering the bus whenever a packet from another subnetwork is present on the bus.

In another aspect the invention features circuitry for generating a collision signal upon detecting competing transmission attempts, a NIU associated with each device to cause withdrawal of an attempted transmission by that device upon receipt of a collision signal, a transmit channel over which transmitted packets are transmitted to the bus, a receive channel over which received packets are transmitted to devices connected to each subnetwork, a station interface unit (SIU) intermediate the NIU and concentrator, a first transmit connector over which transmitted packets pass from the NIU to the SIU, a receive connector over which received packets pass from the SIU to the NIU, a collision signal connector over which collision signals pass from the SIU to the NIU, a second transmit connector over which transmitted packets pass from the SIU to the transmit channel, a combined receive and collision signal connector over which collision signals pass from the concentrator to the SIU, and over which received packets pass from the receive channel to the SIU, and demultiplexing circuitry in the SIU for routing collision signals to the collision signal connector and received packets to the receive connector.

In preferred embodiments, there is logic means responsive to each attempted transmission to generate an attempted transmission signal corresponding to the device attempting the transmission; logic means responsive to competing transmission attempts to generate competing attempt signals corresponding to each separate attempt except the selected attempt (which is, in one preferred embodiment, the first initiated attempt) and to generate an enable signal corresponding to the selected attempt; gating circuitry responsive to attempted transmission signals, to competing attempt signals, and to enable signals to allow transmission onto the subnetwork and the bus of the selected attempt and to route a collision signal to each interface unit attempting transmission, other than the interface unit associated with the selected attempt; multiplexing circuitry for multiplexing collision signals and received packets, responsive to transmission attempts, to permit passage of collision signals, and to prevent passage of received packets, from the concentrator to each SIU associated with each device originating each transmission attempt whenever each of the transmission attempts is detected by the concentrator, and to prevent passage of collision signals, and to permit passage of received packets, from the concentrator to each SIU whenever no transmission attempts are detected by the concentrator; demultiplexing circuitry, responsive to transmission attempts, to permit passage of collision signals, and to prevent passage of received packets, from the station interface unit to the NIU whenever a transmission attempts has been originated, and to prevent passage of collision signals, and to permit passage of received packets, from the SIU to the NIU whenever no transmission attempt has been originated.

The number of potential collisions in the LAN is greatly reduced by the "local" collision avoidance circuitry of the concentrator, which does not permit collisions within subnetworks, and which always allows one packet, out of several competing packets, to be transmitted, rather than to cause all competing packets to be withdrawn.

Collisions in the LAN among packets from separate subnetworks are further greatly reduced by grouping frequently intercommunicating devices together in one subnetwork, thereby reducing the need to send packets from one subnetwork to another. This grouping of frequently intercommunicating devices in one subnetwork reduces the lengths of the buses between subnetworks because the buses do not have to be so long as to accomodate direct connections with each device in the LAN. As a result, the time that a packet is on a bus is reduced, concomitantly reducing the period of time during which a collision might occur.

Multiplexing circuitry in the concentrator and demultiplexing circuitry in the SIU permit a two-path connection between the concentrator and the SIU and a three-path connection between the SIU and the standard NIU, in compliance with IEEE 802.3 standard for "Attachment Unit Interface."

Other advantages and features will become apparent from the following description of the preferred embodiment, and from the claims.

DESCRIPTION OF THE PREFERRED EMBODIMENT

We first briefly describe the drawings.
Drawings
FIG. 1 is a schematic representation of a subnetwork in accordance with the preferred embodiment.

Circuitry

Figure 1:
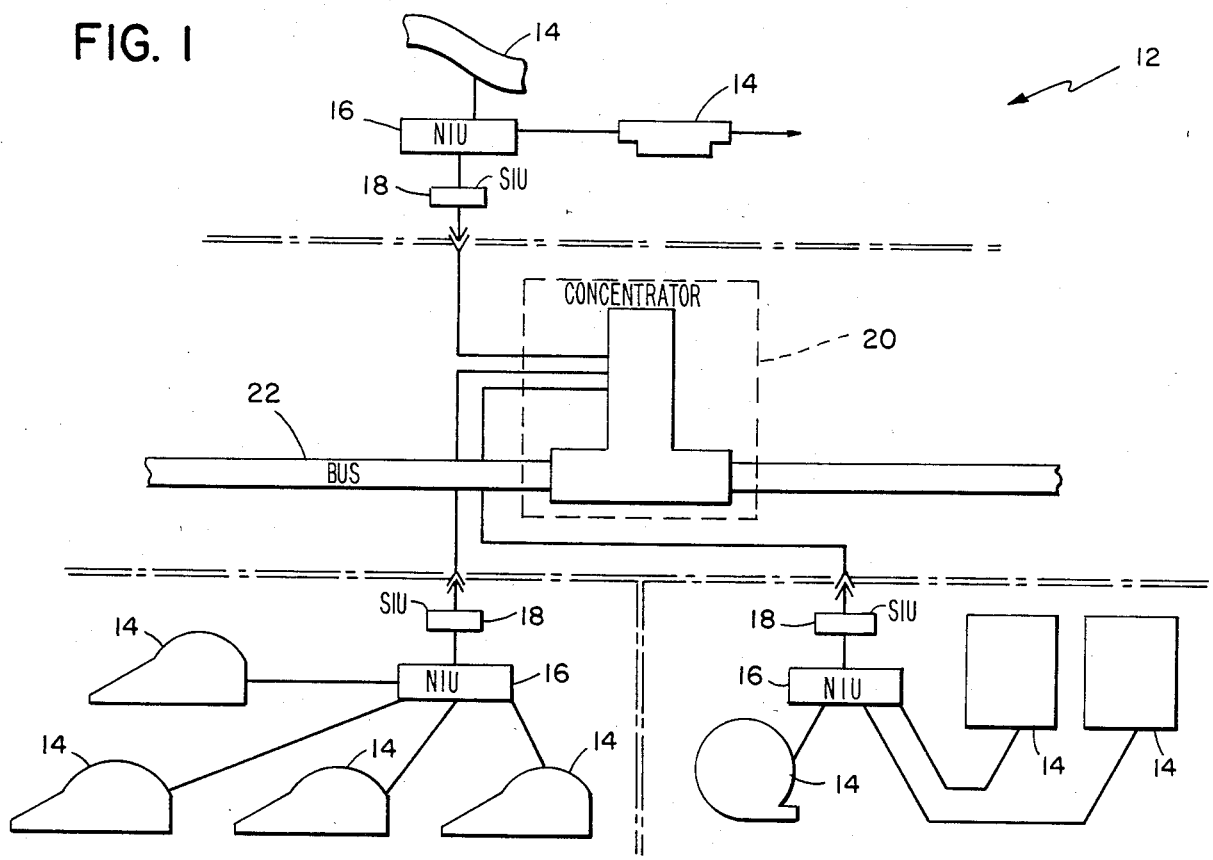

Referring to FIG. 1, a subnetwork 12 of a LAN has a number of data processing and transmitting devices 14, each of which is attached to a conventional (e.g. Ungermann Bass NIU-1 or NIU-2) collision detect type network interface unit (NIU) 16. Each NIU 16, in turn, is connected to its own SIU 18, which, in general, has switching circuitry that permits NIUs 16 to receive either packets from other devices 14 or collision signals from within its subnetwork 12 or from other subnetworks in the LAN. Each SIU 18 is connected to a concentrator 20, which regulates access to subnetwork 12 and allows it to be connected to coaxial bus 22.

Figure 2:
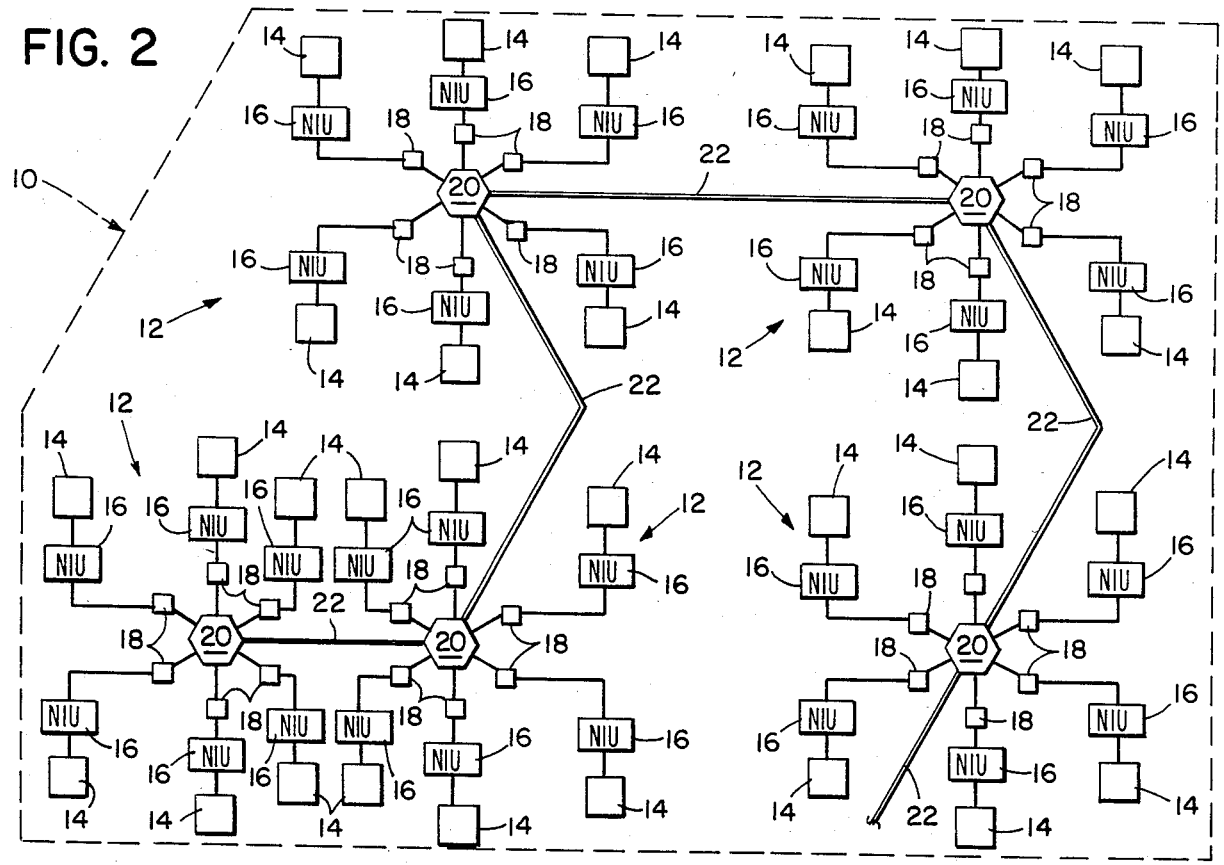
FIG. 2 is a schematic representation of a LAN in accordance with the preferred embodiment.

FIG. 2 illustrates schematically that a number of subnetworks 12 in an LAN 10 may be interconnected by coaxial bus 22. Each subnetwork 12 has a concentrator 20 to which are connected a number of NIUs 16, each of which may have connected to it a number of devices 14. An NIU 16 and SIU 18 may be connected into the circuitry of a device.

Figure 3:
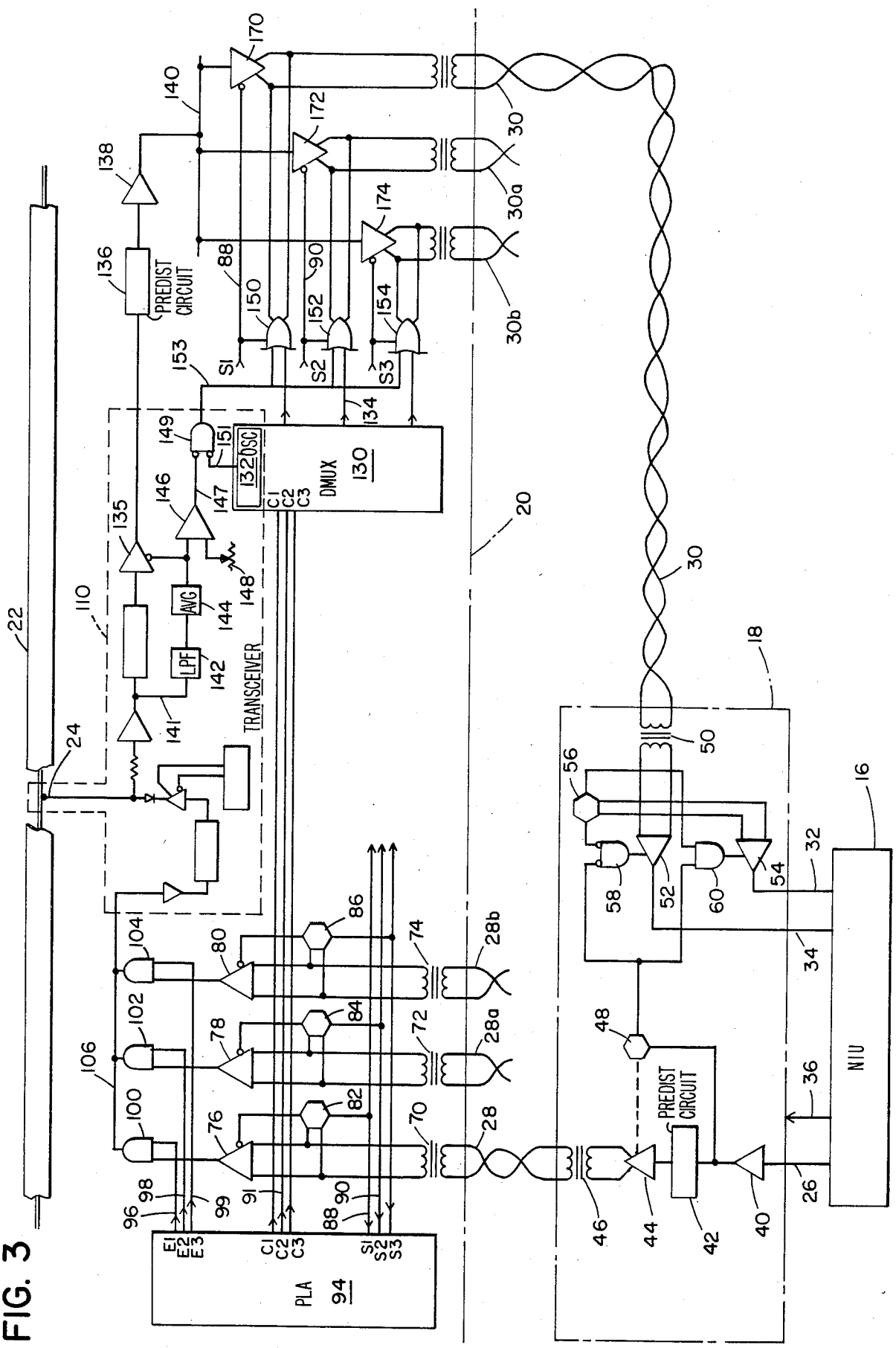
FIG. 3 is a schematic representation of the circuitry of the concentrator and SIU, and the interconnections among the NIU, the SIU, the concentrator, and the bus, in accordance with the preferred embodiment.

FIG. 3 is a schematic diagram of the circuitry of concentrator 20 and SIU 18 and the interconnections among NIU 16, SIU 18, concentrator 20, and bus 22. In general, a transmitted packet moves from NIU 16 to SIU 18 via line 26, then to concentrator 20 via line 28 (a twisted pair identical to lines 28a, 28b which carry transmitted packets from other SIUs 18, not shown). From concentrator 20, the transmitted packet goes either to an addressee device outside subnetwork 12 via bus 22 (connected to concentrator 20 at connection 24) or to an addressee device 14 within subnetwork 12 via, e.g., line 30 (a twisted pair identical to lines 30a, 30b, which connect to other SIUs 18). Line 30 also carries collision signals to SIU 18, which sends them and received packets to NIU 16 via, respectively, collision line 32 and receive line 34. Line 36 carries power.

A transmitted packet from NIU 16 propagates to impedance matching buffer 40, to predistortion circuit 42 (for improvement of waveform integrity), then through line driver 44, transformer 46, and line 28 to transformer 70 within concentrator 20. On its way between impedance matching buffer 40 and predistortion circuit 42, the packet activates squelch 48, which is part of a subcircuit within SIU 18 that routes received packets and collision signals out of SIU 18 to NIU 16.

Received packets or collision signals arriving at SIU 18 via line 30 first propagate through transformer 50, and then to receive buffer 52, and collision buffer 54 (both of which match impedances and improve waveform integrity), activating squelch 56, which is activated only by incoming signals of appropriate amplitude and duration, thereby filtering, among other things, crosstalk on line 30.

When squelch 56 is activated by either a received packet or a collision signal, it sends a "low" voltage signal (a "low") to gate 58 and a "high" voltage signal (a "high") to gate 60. Gate 58 is enabled whenever it receives both a "low" from squelch 56 and a "low" from squelch 48 (which occurs when squelch 48 detects no transmitted packets), thereby activating receive buffer 52 and permitting propagation of received packets over line 34 to NIU 16. Gate 60 is enabled whenever it receives both a "high" from squelch 56 and a high from squelch 48 (which occurs when squelch 48 detects a transmitted packet), thereby activating collision buffer 54 and permitting propagation of collision signals over line 32 to NIU 16. This interaction among squelches 48, 56 and gates 58, 60 demultiplexes received packets and collision signals incoming over line 30 onto lines 34 and 32, respectively.

Within concentrator 20, the transmitted packet propagates from transformer 70 (identical to transformers 72, 74), to buffer 76 (identical to buffers 78, 80) and activates squelch 82 (identical to squelches 84, 86), which sends a signal ($S_1$) via line 88 to PLA (Programmable Logic Array) 94, to collision gate 150 (which is enabled, thereby allowing collision signals, if any, to pass through it to SIU 18 via line 30), and to receive buffer 170 (which closes, thereby not allowing received packets onto line 30). Collision gates 150, 152, 154 are identical, as are receive buffers 170, 172, 174.

If PLA 94 receives no other signal from either of squelches 84, 86, it sends an enabling signal ($E_1$) via line 96 (identical to lines 98, 99) to gate 100 (identical to gates 102, 104), which is enabled and allows the transmitted packet onto transmission bus 106, from which it propagates to standard transceiver circuitry 110 (e.g., circuitry such as that of Digital Equipment Corporation Model H-4000 Ethernet Transceiver), which has, in general, conventional circuitry (including an equalizer) to condition both transmitted and received packets, to limit the length of transmitted packets, and to sense collisions on bus 22. Transceiver 110 broadcasts the transmitted packet throughout the LAN for pickup by its addressee device.

At times, a transmitted packet from SIU 18 arrives at concentrator 20 via line 28 just ahead of a transmitted packet from another SIU in the same subnetwork via, e.g., line 28a. The second packet propagates through transformer 72 and activates squelch 84, which sends a signal ($S_2$) over line 90 that enables collision gate 152, closes receive buffer 172 and reaches PLA 94 just after signal ($S_1$) does. PLA 94 senses that signal ($S_1$) was absolutely first, and sends a signal ($E_1$) via line 96 that enables gate 100 (permitting the first transmitted packet to pass to transmitter bus 106, and to transceiver 110 for broadcasting throughout the LAN). PLA 94 also sends a signal ($C_2$) via line 91 to demultiplexer (DMUX) 130, which sends a collision signal (generated by 10 MHz oscillator 132) via line 134 to collision gate 152, through which it passes to line 30a for transmission back to the NIU that had originated the second transmitted packet. This collision signal is "private"; that is, only the NIU that was the source of the second transmission receives it; whereupon the NIU withdraws the transmission. In addition, PLA 94 does not send a signal ($E_2$) to enable gate 102, through which the second transmitted packet would have passed had it been absolutely first.

In general, received packets from any source in the LAN pass through the receiver circuitry of transceiver 110, through predistortion circuit 136 and buffer 138, and onto receiver bus 140, from which they move through each of receive buffers 170, 172, 174, to lines 30, 30a, 30b, to be read by appropriate addressees.

Collisions on bus 22 between packets from separate subnetworks cause collision signals to be sent by each concentrator in LAN 10 to all SIUs, as distinguished from the "private" signalling for collision avoidance within a subnetwork, discussed above. When more than one packet is on bus 22, the voltage level drops below the level when only one packet is on the line. A subcircuit within transceiver 110 monitors said voltage level and, whenever it detects such a drop, causes a collision signal to pass to all NIUs in subnetwork 12, as follows. Energy passes first through low pass filter 142 (which taps into the conventional receiver circuitry via line 141) and moves through DC voltage averaging circuit 144 to comparator 146, which also receives from trim pot 148 a standard signal whose voltage level is slightly lower (to compensate for noise on the line) than the voltage level on bus 22 when two packets are on it. Whenever comparator 146 in comparing the two voltage levels thus detects a collision on the bus, it sends an enabling signal over line 147 to gate 149 (connected also by line 151 to oscillator 132), which then opens to permit a 10 MHz collision signal from oscillator 132 to pass via line 153 to each of collision gates 150, 152, 154, through which it passes via lines 30, 30a, 30b to all transmitting SIUs and NIUs, which withdraw their transmissions. In addition, gate 135 in the receiver circuit is connected to DC voltage averaging circuit 144 and is disabled when it detects a drop in voltage on bus 22, thus preventing received packets from passing from transceiver 110 to predistortion circuit 136.

Operation

In operation, packets move in the hybrid collision avoidance/collision detection system of the invention generally as already described. The circuitry of concentrator 20 provides both for "local" collision avoidance within its own subnetwork 12 and for collision detection operation between two or more subnetworks 12 interconnected over coaxial bus 22. This local collision avoidance circuitry allows the transmitted packet that was absolutely the first to reach concentrator 20, to continue, while sending private collision signals to all other NIUs 16 in subnetwork 12 that had attempted transmissions. No collisions, therefore, can occur within subnetwork 12, thereby increasing efficiency because one of two or more "simultaneous" transmissions always will be permitted to continue. When collisions occur between packets on bus 22, a general collision signal is sent by concentrators 110 to all transmitting NIUs 16 in their respective subnetworks 12, causing all attempted transmissions to be withdrawn.

In addition, devices 14 that most often are to communicate with each other are grouped together around a single concentrator 20 so that their intercommunications may be handled through local collision avoidance circuitry, thus reducing the need for transmissions on bus 22 between subnetworks 12 and reducing, thereby, the probabilities of collisions on bus 22.

Moreover, the grouping of frequently intercommunicating devices around a common concentrator 20 permits the total of the lengths of the buses between subnetworks to be reduced because the bus does not have to be long enough to accommodate direct connections with each device 14 in the LAN. This results in greater efficiency because the period of time that a packet is on a bus (the "collision window") is, in part, a function of the length of said bus: the shorter the bus, the smaller the collision window, and the lower the probability that collisions will occur.

The interaction among collision gates 150, 152, 154 and receive buffers 170, 172, 174, described above, multiplexes collision signals and received packets onto a single signal path, thereby permitting the connection between SIU 18 and concentrator 20 to be made simply by, e.g. two shielded twisted pairs. In addition, the interaction in SIU 18 among squelches 48, 56 and gates 54, 58 demultiplexes collision signals and received packets onto, respectively, lines 32, 34, thereby making possible a three-path (plus power) interface between standard NIUs and SIUs 18 that is fully compliant with IEEE 802.3 standard for "Attachment Unit Interface" (AUI).

Other embodiments are within the following claims.

We claim:

1. A data communication network over which data handling devices connected thereto can transmit and receive messages among themselves, comprising bus means, and a plurality of subnetworks, each subnetwork comprising interface means for connecting a plurality of said devices to said subnetwork, and concentrator means for connecting said interface means to said bus means, said interface means and said concentrator means further comprising transceiver means for transmitting, to said bus means and to devices connected to said subnetwork, messages originating from devices connected to said subnetwork, and for receiving from said bus means messages originating from other said subnetworks, collision avoidance means for monitoring transmission attempts by said devices connected to said subnetwork, detecting competing such transmission attempts that would create a collision on said subnetwork, and, upon such detection, permitting a selected such attempt to enter said subnetwork while preventing other such attempts from entering said subnetwork, and collision detection means for monitoring said bus means and preventing all said attempted transmissions from entering said bus means when a message from another said subnetwork is present on said bus means.

2. The network of claim 1 wherein said collision avoidance means comprises means for generating a collision signal upon said detecting competing transmission attempts, said interface means comprises a network interface unit associated with each said device to cause withdrawal of an attempted transmission by said device upon receipt of a said collision signal, and said collision avoidance means further comprises switching means for allowing said collision signal to reach all of said interface units in said subnetwork attempting a transmission except said unit associated with said device originating said selected transmission attempt.

3. The network of claim 2 wherein said collision avoidance means comprises logic means responsive to each said attempted transmission to generate an attempted transmission signal corresponding to the device attempting said transmission, said logic means further comprising means responsive to competing transmission attempts to generate competing attempt signals corresponding to each said attempt except said selected attempt and to generate an enable signal corresponding to said selected attempt, and said concentrator means comprises gating means responsive to said attempted transmission signals, to said competing attempt signals, and to said enable signals to allow transmission onto said subnetwork and said bus of said selected attempt and to route said collision signal to said interface units attempting transmissions other than said unit associated with said selected attempt.

4. The network of claim 2 wherein selected attempt is the first-initiated attempt.

5. The network of claim 1 wherein said collision detection means comprises monitoring means for monitoring the presence of said messages on said bus means, collision signal generating means responsive to said monitoring means for generating a collision signal whenever said messages are present on said bus, and switching means for allowing said collision signal to reach all of said interface units in said subnetwork attempting a transmission.

6. The network of claim 5 wherein said collision detection means comprises switching means, responsive to the presence of said messages on said bus means, for preventing receipt of said messages by said interface means.

7. The network of claim 1 wherein said concentrator means has a portion connected to said bus means, and said transceiver means comprises transmission means for conditioning said messages originating from devices connected to said subnetwork for sending through said portion to said bus means, and receiving means for receiving messages originating from other said subnetworks through said portion from said bus means, for conditioning said messages, and for sending said messages to said devices connected to said subnetwork.

8. The network of claim 7 wherein said concentrator means further comprises housing means for housing said concentrator means, and first port means for connecting said concentrator means to said interface means, and second port means for connecting the opposite ends of said bus means to said portion.

9. The network of claim 8 wherein said second port means comprises oppositely opening coaxial ports.

10. The network of claim 2 wherein said concentrator means comprises a transmit channel over which messages originating with said subnetwork are transmitted to said bus, and a receive channel over which received messages are transmitted to devices connected to said subnetwork, and said interface means comprises a further interface unit intermediate said network interface unit and said concentrator, said network further comprising a first transmit connector over which transmitted messages pass from said network interface unit to said further interface unit, a receive connector over which received messages pass from said further interface unit to said network interface unit, a collision signal connector over which said collision signals pass from said further interface unit to said network interface unit, a second transmit connector over which transmitted messages pass from said further interface unit to said transmit channel, a combined receive and collison signal connector over which said collision signals pass from said concentrator to said further interface unit, and over which said received messages pass from said receive channel to said further interface unit, and demultiplexing means in said further interface unit for routing collison signals to said collision signal connector and received messages to said receive connector.

11. A data communication network over which data handling devices connected thereto can transmit and receive messages among themselves, comprising bus means, and a plurality of subnetworks, each subnetwork comprising interface means for connecting a plurality of said devices to said subnetwork, and concentrator means for connecting said interface means to said bus means, said interface means and said concentrator means further comprising transceiver means for transmitting, to said bus means and to devices connected to said subnetwork, messages originating from devices connected to said subnetwork, and for receiving from said bus means messages originating from other said subnetworks, collision avoidance means for monitoring transmission attempts by said devices connected to said subnetwork, for detecting competing such transmission attempts that would create a collision on said subnetwork, collision signal generating means for generating a collision signal upon detecting competing transmission attempts, and a network interface unit associated with each said device to cause withdrawal of an attempted transmission by said device upon receipt of a said collision signal, and a transmit channel over which messages originating with said subnetwork are transmitted to said bus, a receive channel over which received messages are transmitted to devices connected to said subnetwork, a further interface unit intermediate said network interface unit and said concentrator, said network further comprising a first transmit connector over which transmitted messages pass from said network interface unit to said further interface unit, a receive connector over which received messages pass from said further interface unit to said network interface unit, a collision signal connector over which said collision signals pass from said further interface unit to said network interface unit, a second transmit connector over which transmitted messages pass from said further interface unit to said transmit channel, a combined receive and collison signal connector over which said collision signals pass from said concentrator to said further interface unit, and over which said received messages pass from said receive channel to said further interface unit, and demultiplexing means in said further interface unit for routing collison signals to said collision signal connector and received messages to said receive connector.

12. The network of claim 11 wherein said concentrator means further comprises switching means for multiplexing said collision signals and said received messages, responsive to said transmission attempts, to permit passage of said collision signals, and to prevent passage of said received messages, from said concentrator means to each said further interface unit associated with each said device originating each said transmission attempt whenever each of said transmission attempts is detected by said concentrator means, and to permit passage of said received messages, and to prevent passage of said collision signals, from said concentrator to each said further interface unit not originating one of said transmission attempts.

13. The network of claim 11 wherein said demultiplexing means comprises switching means, responsive to said transmission attempts, to permit passage of said collision signals, and to prevent passage of said received messages, from said further interface unit to said network interface unit whenever one of said transmission attempts has been originated by said network interface unit, and to prevent passage of said collision signals, and to permit passage of said received messages, from said further interface unit to said network interface unit whenever no transmission attempt has been originated by said network interface unit.

* * * * *